US012171705B2

(12) United States Patent
Renaud et al.

(10) Patent No.: US 12,171,705 B2
(45) Date of Patent: Dec. 24, 2024

(54) MEDICAL BED WITH POWER ASSISTANCE

(71) Applicant: USINE ROTEC INC., Baie-du-Febvre (CA)

(72) Inventors: Sébastien Renaud, Trois-Rivières (CA); Jonathan St-Yves, Trois-Rivières (CA); Yvon Lemire, Baie-du-Febvre (CA)

(73) Assignee: USINE ROTEC INC., Baie-du-Febvre (CA)

( * ) Notice: Subject to any disclaimer, the term of this patent is extended or adjusted under 35 U.S.C. 154(b) by 204 days.

(21) Appl. No.: 17/708,889

(22) Filed: Mar. 30, 2022

(65) Prior Publication Data

US 2022/0313520 A1 Oct. 6, 2022

Related U.S. Application Data

(60) Provisional application No. 63/167,760, filed on Mar. 30, 2021.

(51) Int. Cl.
*A61G 7/08* (2006.01)
*A61G 7/05* (2006.01)

(52) U.S. Cl.
CPC ............. *A61G 7/08* (2013.01); *A61G 7/0528* (2016.11); *A61G 2200/32* (2013.01); *A61G 2203/10* (2013.01); *A61G 2203/32* (2013.01); *A61G 2203/38* (2013.01); *A61G 2203/726* (2013.01)

(58) Field of Classification Search
CPC .... A61G 7/08; A61G 7/0528; A61G 2200/32; A61G 2203/10; A61G 2203/32; A61G 2203/38; A61G 2203/726; A61G 5/047
See application file for complete search history.

(56) References Cited

U.S. PATENT DOCUMENTS 6,143,993 A * 11/2000 Andersson ............ G01L 1/2206
73/862.471
6,330,926 B1 * 12/2001 Heimbrock .......... A61G 1/0225
280/43.17

(Continued)

OTHER PUBLICATIONS

International Search Report and Written Opinion dated Jun. 28, 2022, Application No. PCT/CA2022/050486, filed Mar. 30, 2022.

(Continued)

*Primary Examiner* — Fredrick C Conley
(74) *Attorney, Agent, or Firm* — NORTON ROSE FULBRIGHT CANADA LLP

(57) ABSTRACT

A medical bed includes a bed frame and a powered wheel mounted to the bed frame via a suspended wheel mechanism including an actuator for displacing the powered wheel between a deployed position and a retracted position where a clearance gap is defined between the powered wheel and the floor surface. An end board mounted to the bed frame includes a load cell integrated therein, the load cell detecting a magnitude of a force applied on the end board by a user and providing input signals to a control system. The input signals indicative of the magnitude of the force applied on the end board by the user. The control system is in communication with the powered wheel to drive the powered wheel with a level of power assistance proportional to the magnitude of the force applied on the end board when the powered wheel is in the deployed position.

17 Claims, 4 Drawing Sheets

(56) References Cited

U.S. PATENT DOCUMENTS

| | | | | |
|---|---|---|---|---|
| 6,791,460 | B2 * | 9/2004 | Dixon | H01R 13/6315 5/624 |
| 7,090,041 | B2 | 8/2006 | Vogel et al. | |
| 7,407,024 | B2 | 8/2008 | Vogel et al. | |
| 7,419,019 | B1 | 9/2008 | White et al. | |
| 7,690,059 | B2 | 4/2010 | Lemire et al. | |
| 10,004,651 | B2 | 6/2018 | DeLuca et al. | |
| 10,799,403 | B2 | 10/2020 | Paul et al. | |
| 2008/0005838 | A1 * | 1/2008 | Wan Fong | A61B 5/7257 5/600 |
| 2009/0188731 | A1 | 7/2009 | Zerhusen et al. | |
| 2009/0222184 | A1 | 9/2009 | Bhai | |
| 2011/0087416 | A1 * | 4/2011 | Patmore | A61G 1/0287 180/19.1 |
| 2014/0041119 | A1 * | 2/2014 | Thodupunuri | A61G 7/08 5/510 |
| 2016/0089283 | A1 * | 3/2016 | DeLuca | A61G 7/08 180/413 |
| 2019/0201255 | A1 * | 7/2019 | Paul | A61G 1/0287 |
| 2019/0298590 | A1 * | 10/2019 | Patmore | A61G 1/0281 |
| 2019/0328594 | A1 | 10/2019 | Meng et al. | |
| 2020/0155384 | A1 * | 5/2020 | Derenne | A61G 1/0268 |
| 2021/0101288 | A1 | 4/2021 | Lee | |
| 2021/0196533 | A1 * | 7/2021 | Derenne | H02P 6/06 |

OTHER PUBLICATIONS

Extended European Search Report dated Aug. 26, 2024, European Application No. 22778262.0 filed Mar. 30, 2022.

* cited by examiner

MEDICAL BED WITH POWER ASSISTANCE

CROSS-REFERENCE

The present application claims priority on U.S. Patent Application No. 63/167,760 filed Mar. 30, 2021, the entire contents of which are incorporated herein by reference.

TECHNICAL FIELD

This disclosure relates generally medical beds, such as those used in a hospital, clinic, rehab or other healthcare setting for example, and more specifically to a medical bed having a powered wheel for providing power assistance.

BACKGROUND

Medical beds, such as those designed to support and/or transport patients in healthcare settings, have wheel assemblies, typically casters, which allow the bed to be displaced on a floor surface by rolling. Such displaceable medical beds can however be hard to control and/or displace when a patient, in particular a heavy patient, is supported thereon. Power assistance is therefore desirable to assist caregivers to more easily displace such beds. At least one of the wheels in contact with the floor surface may be powered, to provide power assistance. Systems to power and/or activate such power assistance can however be heavy, complex and/or ill-suited for healthcare applications. For instance, existing power assistance systems can be burdensome to operate, and/or complex to integrate within existing medical bed architectures, such as lift mechanisms, modular components and/or electrical controls of the medical beds. Sanitary and security requirements or standards may remain a challenge for medical beds and power assistance designs.

SUMMARY

There is accordingly provided a medical bed comprising: a bed frame having casters permitting rolling displacement of the bed on a floor surface, the bed frame defining a longitudinal axis extending between a forward end and a rearward end of the medical bed; a powered wheel mounted to the bed frame via a suspended wheel mechanism, the suspended wheel mechanism including an actuator for displacing the powered wheel between a retracted position and a deployed position, the powered wheel in the retracted position defining a clearance gap between the powered wheel and the floor surface, and the powered wheel in the deployed position contacting the floor surface; and an end board mounted to the bed frame, the end board including a load cell integrated therein, the load cell detecting a magnitude of a force applied on the end board by a user, the load cell providing one or more input signals to a control system, the one or more input signals indicative of the magnitude of the force applied on the end board by the user, the control system in communication with the powered wheel to drive the powered wheel with a level of power assistance proportional to the magnitude of the force applied on the end board by the user when the powered wheel is in the deployed position, the load cell forming at least part of a load path between the end board and the bed frame, the force applied on the end board by the user transmitted along the load path to a reaction force interface between the end board and the bed frame.

There is also provided a power assist system for a medical bed, comprising: a powered wheel; a suspended wheel mechanism adapted to be mounted to a frame of the medical bed, the suspended wheel mechanism supporting the powered wheel, the suspended wheel mechanism including an actuator for displacing the powered wheel between a retracted position and a deployed position, the powered wheel in the retracted position adapted to define a clearance gap between the powered wheel and a floor surface, and the powered wheel in the deployed position adapted to contact the floor surface; a control system in communication with the suspended wheel mechanism and the powered wheel; and a load cell adapted to be mounted within an end board of the medical bed, the load cell in communication with the control system to detect a magnitude of a force applied on the end board by a user, the load cell providing one or more input signals to the control system that are indicative of the magnitude of the force applied on the end board by the user, and wherein the control system drives the powered wheel with a level of power assistance proportional to the magnitude of the force applied on the end board by the user as indicated by the one or more input signals from the load cell when the powered wheel is in the deployed position.

The medical bed and/or the a power assist system as defined above and as described elsewhere herein may also include one or more of the following additional features in whole or in part, and in any combination.

In certain aspects, the end board includes a hollowed panel, the load cell enclosed within the hollowed panel, the load cell supporting a substantial portion of a weight of the end board.

In certain aspects, the end board is located at a foot end of the medical bed and defines a footboard thereof.

In certain aspects, the powered wheel is located at a head end of the medical bed.

In certain aspects, the end board is removable from a remainder of the medical bed, with the load cell remaining enclosed within the end board while being electrically disconnected from the control system.

In certain aspects, the load cell is one of two or more load cells integrated into the end board.

In certain aspects, the load path is a unique load path between the end board and the bed frame.

In certain aspects, the bed frame includes a base frame to which the suspended wheel mechanism is mounted and an upper frame to which the end board is mounted, the upper frame connected to the base frame via a plurality of articulated frame members defining a lift mechanism actuatable to displace and position the upper frame towards and away from the base frame during bed height adjustment between a fully collapsed position and a fully elevated position relative to the base frame.

In certain aspects, the load cell detects a direction of the force applied on the end board by the user.

In certain aspects, the load cell and/or the control system are configured to be insensitive to loads applied in one or more directions.

In certain aspects, the load cell is insensitive to loads applied on the end board in a direction transverse to the longitudinal axis.

In certain aspects, the load cell and/or the control system are configured to be insensitive to torque generated on the end board by a force applied in a substantially vertical direction and/or in a direction normal to the longitudinal axis and to a laterally extending axis transverse to the longitudinal axis.

In certain aspects, the powered wheel is bidirectional to provide motive power only in two opposite and linear directions.

In certain aspects, the powered wheel includes a motor embedded inside a wheel hub of the powered wheel.

In certain aspects, the suspended wheel mechanism includes a biasing member, the biasing member operable to bias the powered wheel against the floor surface when the powered wheel is in the deployed position, and the biasing member applying little to no load against the actuator when the powered wheel is in the retracted position.

In certain aspects, the load cell supports at least 70% of a total weight of the end board.

In certain aspects, the end board includes a hollowed panel mounted to a base frame enclosed within the hollowed panel, the base frame including a transversely extending hollow portion and an more upwardly extending member, the transversely extending hollow portion of the base frame having an internal frame member extending therethrough without contacting the base frame, a first end of the load cell being secured to the internal frame member and second end of the load member being secured to the upwardly extending member.

In certain aspects, a clearance gap is defined between the upwardly extending member and an inner surface of the hollowed panel of the end board when no load is applied to the end board, the inner surface of the hollowed panel contacting the upwardly extending member when the force is applied to the end board.

In certain aspects, the control system is operable to: detect that the force applied to the end board has been released or is under a selected load threshold for a selected time lapse; and reduce the level of power assistance generated by the powered wheel to provide a powered deceleration assistance of the medical bed.

In another aspect, there is provided a medical bed comprising: a bed frame; a powered wheel mounted to the bed frame via a suspended wheel mechanism, the suspended wheel mechanism including an actuator for displacing the powered wheel between a retracted position in which a clearance gap is defined between the powered wheel and a floor surface, and a deployed position for contacting the floor surface with the powered wheel; and an end board mounted to the bed frame, the end board including at least one load cell integrated therein, the at least one load cell detecting a load applied on the end board by a user, the at least one load cell providing input signals to a control system, the input signals indicative of the load applied on the end board by the user, the control system in communication with the powered wheel to drive the powered wheel with a level of power assistance proportional to the load applied on the end board by the user when the powered wheel is in the deployed position, the at least one load cell forming at least part of a load path between the end board and the bed frame, the load applied on the end board by the user transmitted along the load path to a reaction force interface between the end board and the bed frame.

In some embodiments, the end board includes a hollowed panel, the at least one cell enclosed within the hollowed panel.

In some embodiments, the end board is located at a foot end of the medical bed and defines a footboard thereof.

In some embodiments, the end board is removable from a remainder of the medical bed.

In some embodiments, the end board includes a pair of load cells.

In some embodiments, the at least one load cell supports a substantial portion of a weight of the end board.

In some embodiments, the load path is a unique load path between the end board and the bed frame.

In some embodiments, the bed frame includes a base frame to which the suspended wheel mechanism is mounted, an upper frame to which the end board is mounted, the upper frame connected to the base frame via a plurality of articulated frame members defining a lift mechanism actuatable to displace and position the upper frame towards and away from the base frame during bed height adjustment between a fully collapsed position and a fully elevated position relative to the base frame.

In another aspect, there is provided a kit comprising a powered wheel system for a medical bed, as described herein.

BRIEF DESCRIPTION OF THE DRAWINGS

Reference is now made to the accompanying figures in which.

DETAILED DESCRIPTION

Figure 1:
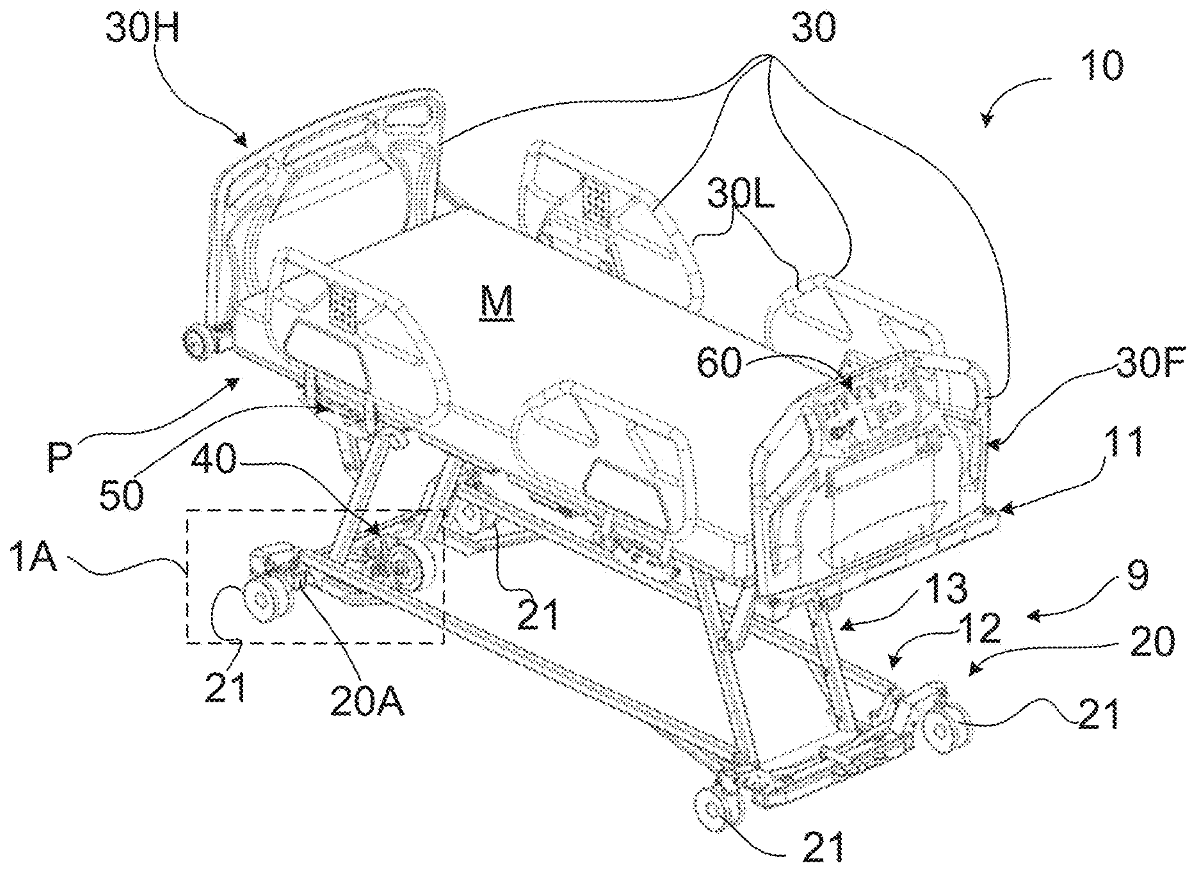
FIG. 1 is a perspective view of a medical bed according to an embodiment.

FIG. 1 illustrates an exemplary medical bed 10. The medical bed 10 is adjustable at least heightwise (e.g. away from a floor surface). The medical bed 10 may in one particular embodiment be a low-profile bed which is able to collapse down into a very low profile elevation while still providing a high load lift capacity. In some embodiments, the minimum vertical height between the floor surface and the mattress supporting surface in the low-profile elevation of the present medical bed 10 is at least less than 9 inches, and may be less than 8.5 inches, while still providing a lift capacity of at least greater than 850 lbs, and preferably greater than 1000 lbs (such as between 1000 lbs and 2000 lbs, and more preferably between 1000 and 1600 lbs). In the depicted embodiment, the medical bed 10 is of the bariatric type. Another example of such bariatric bed is disclosed in U.S. Pat. No. 9,314,385, the entire contents of which are incorporated herein by reference.

The medical bed 10 (or simply "bed") has a bed frame 9 forming the skeleton, or supporting structure, of the bed 10. The bed frame 9 includes an upper frame section, or upper frame 11 (also referred to herein as the "main frame"), to which is mounted a mattress support platform P, which may support a mattress M, as shown. The medical bed 10 has a base frame section, or base frame 12, connected to the upper frame 11 via a plurality of articulated frame members 13 defining a lift mechanism actuatable to displace and position the upper frame 11 towards and away from the base frame 12 during bed height adjustment between a fully collapsed position and a fully elevated position relative to the base frame 12.

The base frame 12 includes a wheel assembly 20. As shown, the wheel assembly 20 includes wheels 21 disposed at the ends, here each of the four corners, of the base frame 12 and mounted thereto. In the depicted embodiment, the wheels 21 are casters to facilitate ease of movement of the bed 10. The wheels 21 define bed support interfaces with the floor surface. Upon application of a force on the bed 10 that is at least partially parallel to the floor surface, a user (e.g. caregiver) may displace the bed 10 by the rolling of the wheels 21 on the floor surface. In some embodiments, such as that shown, a wheel locking mechanism 20A at one or more of the caster wheels 21 may also be provided. The wheel locking mechanism 20 is adapted to selectively lock/unlock rotation of the caster wheels 21 about respective rolling axes and/or steering axes.

The bed 10 has a plurality of side panels 30 (or "barriers") to better secure a patient supported by the bed 10. These side panels 30 include lateral panels 30L disposed on opposite sides of the bed 10 along a length thereof, and end panels (or "end boards" or simply "boards") at a head end and at a foot end of the bed 10. The end boards include a headboard 30H and a footboard 30F located respectively at the head end and foot end of the bed 10. The headboard 30H and the footboard 30F are connected to the upper frame 11. At least the footboard 30F is removably engaged to the upper frame 11 (directly or via other intermediary parts). Such removable footboard 30F may be desirable for medical bed 10, for instance in urgent situations where more space for users is required and/or when a patient must be lifted from the bed 10. In some embodiments, both the headboard 30H and the footboard 30F are removable. The removable engagement arrangement is adapted to quickly and easily disconnect the headboard 30H and/or footboard 30F from the upper frame 11 by lifting it vertically upward. In at least some embodiments, the lateral panels 30L are selectively foldable in that they may stand in an upright position to secure the patient laterally on the bed 10, and if desired, the lateral panels 30L may be folded or slid down, along the sides of the bed 10. In other embodiments, the lateral panels 30L may be removable instead of or in addition to being foldable or slidable.

The bed 10 includes a powered wheel system 40 (also referred to herein as a power assist system 40), as will be described in further detail below, in order to assist a user to displace the bed 10 on the floor surface, when desired. When a patient, especially a heavy and/or obese patient, is supported on a standard, non power assisted, bed, forces required to move the bed from one location to another, and/or to control the displacement of the bed may be high and the effort required by users in order to displace such loaded beds may be burdensome.

Figure 1A:
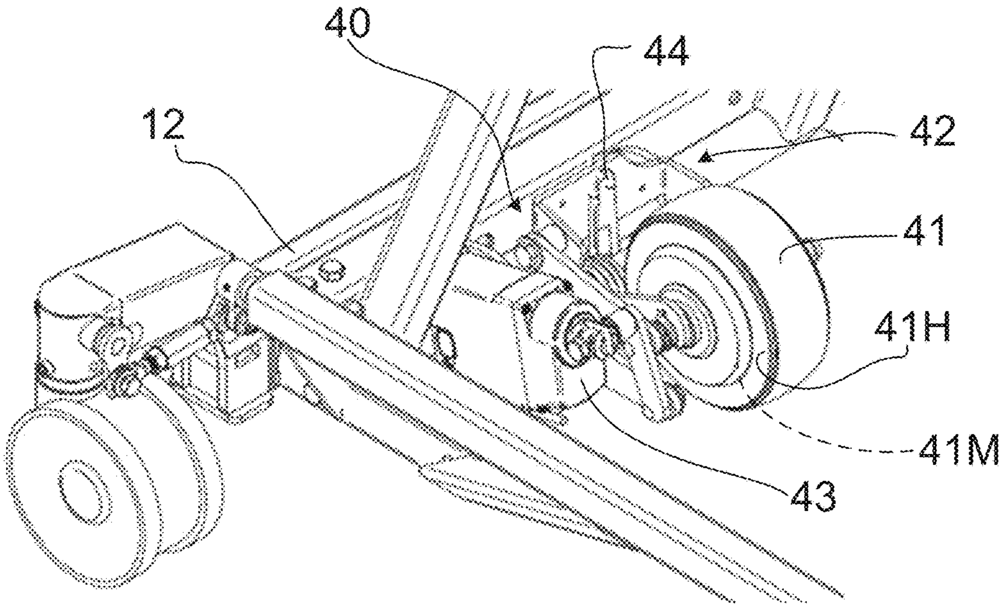
FIG. 1A is an enlarged perspective view of a powered wheel of the medical bed of FIG. 1, taken from region 1A in FIG. 1.

Referring to FIG. 1A, the power assist system 40 of the present bed 10 includes a powered wheel 41 mounted to the base frame 12 via a suspended wheel mechanism 42. The power wheel 41 is provided in addition to the caster wheels 21 located at the four corners of the base frame 12. The suspended wheel mechanism 42 may include articulated members, as shown, actuatable to allow movement and mounting of the powered wheel 41 relative to the base frame 12. The suspended wheel mechanism 42 includes an actuator 43 to lift and deploy the powered wheel 41 between a retracted position, in which the powered wheel 41 is released from the floor surface, and a deployed position, in which the powered wheel 41 may contact the floor surface to provide motive power to displace the bed 10.

The powered wheel 41 is bidirectional so as to provide motive power only in two opposite and linear directions, such as forward and rearward when taken along a longitudinal dimension of the bed 10, as opposed to being steerable in omnidirectional directions. The powered wheel 41 includes a motor 41M embedded inside its wheel hub 41H. In other embodiments, the powered wheel 41 may not enclose a motor. For instance, the powered wheel 41 may be drivingly engaged to a drive motor external thereto, for instance via a transmission. In the depicted embodiment, the actuator 43 is a linear actuator pivotally mounted to the base frame 11 at one end and to a wheel support member at an opposite end. The suspended wheel mechanism 42 includes a biasing member 44 for biasing the powered wheel 41 against the floor surface when the powered wheel 41 is in the deployed position. However, in the retracted position, the biasing member 44 is unloaded such that little to no load is applied against the actuator 43 by the biasing member 44 when the suspended wheel mechanism 42 is in the retracted position. In the depicted embodiment, the biasing member 44 is a spring mounted on a pivot axle of the suspended wheel mechanism 42. Other types of biasing members may be contemplated.

In the depicted embodiment, the bed 10 has a single retractable powered wheel 41 positioned at one longitudinal end of the bed 10. There may be a second (or more) powered wheel in other embodiments, such as a second or more powered wheel at the opposite longitudinal end of the bed 10. In the depicted embodiment, the powered wheel 41 is located at the head end of the bed 10. In most embodiments, such location is desirable since the load distribution on the bed 10 may be concentrated closer to the head end of the bed 10 than to the foot end. For instance, a patient upper body is typically heavier than the patient lower body, such that load distribution on the bed 10 may be at least slightly shifted towards the head end. In some practical applications, a user who wants to displace the bed 10 may apply a force at the foot end of the bed 10 and/or control the displacement of the bed 10 at such end. In embodiments where the powered wheel 41 is located at the opposite end from that where the force is applied, steering and/or control of the bed 10 may be facilitated. A distance between the application of the force by the user and the powered wheel 41 may be maximized.

In at least some embodiments, the powered wheel 41 is laterally disposed at a lateral center point at such head end of the bed 10. Alignment of the powered wheel 41 at the center point may be desirable in certain embodiments, since it may facilitate straight displacement of the bed 10 in forward/backward directions without (or with limited) undesirable lateral steer of the bed 10 during displacement.

Figure 2A:
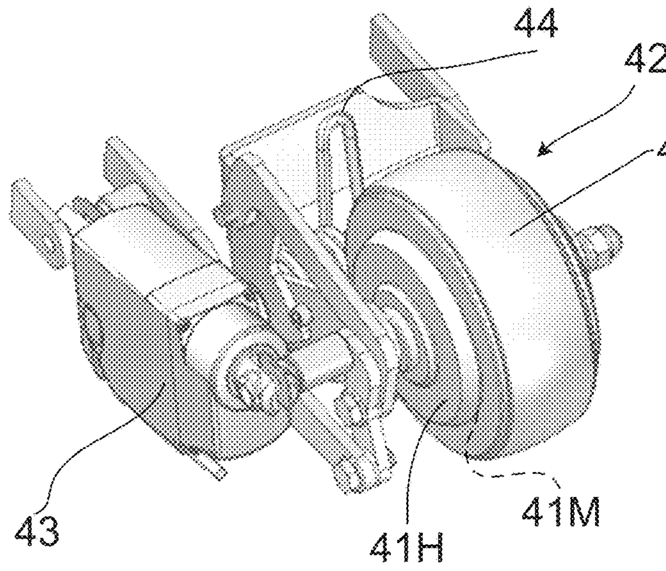
FIG. 2A is another perspective view of a powered wheel of the medical bed as shown in FIG. 1, shown in a retracted position.
Figure 2B:
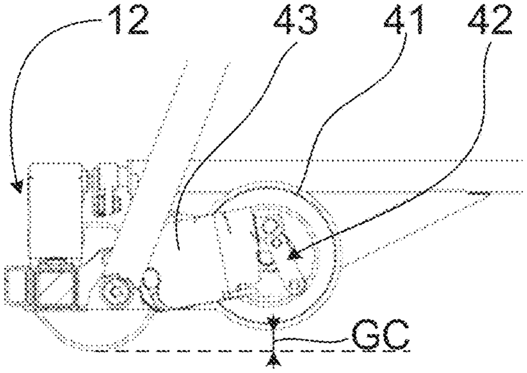
FIG. 2B is a side elevation view of the powered wheel in the retracted position shown in FIG. 2A.
Figure 2C:
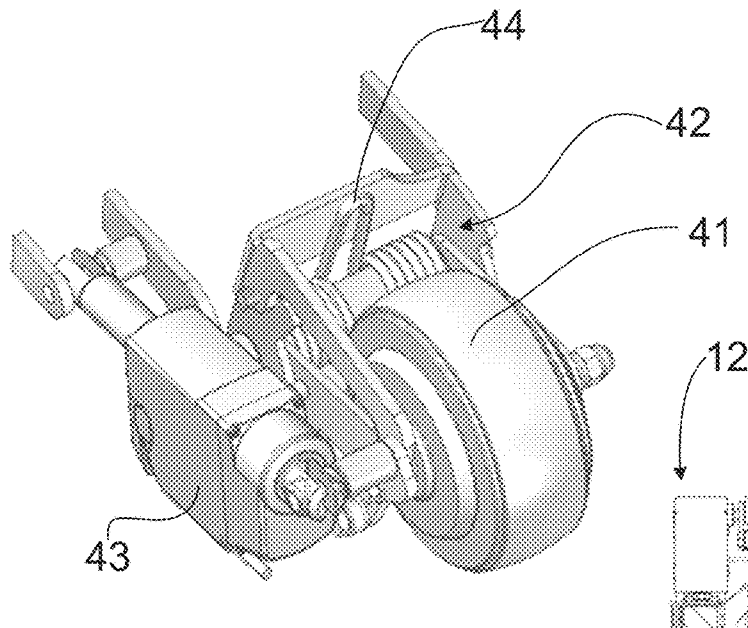
FIG. 2C is a perspective view of the powered wheel of FIG. 2A, shown in a deployed position.
Figure 2D:
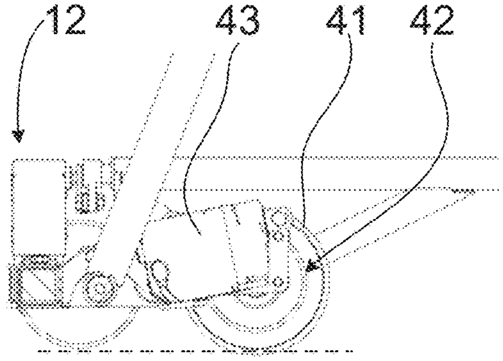
FIG. 2D is a side elevation view of the powered wheel in the deployed position shown in FIG. 2C.

Referring to FIGS. 2A to 2D, the exemplary powered wheel 41 and the suspended wheel mechanism 42 are shown in isolation. For applications such as low-profile/bariatric beds where the bed 10 may collapse down into a very low profile elevation, the powered wheel 41 and suspended wheel mechanism 42 may be desirably adapted to retract while still permitting the bed 10 to drop to a very-low minimum height (e.g. 8 inches above the floor). FIGS. 2A-2B show the wheel 41 and mechanism 42 in a fully retracted position. As shown, a clearance gap GC between the floor surface and the powered wheel 41 is provided in such position. In the retracted position, the powered wheel 41 is maintained at a low elevation relative to the base frame 12 and may allow the bed 10 to drop to its very-low minimum height. FIGS. 2C-2D show the wheel 41 and mechanism 42 in a fully deployed position, where the wheel 41 may touch the floor surface. In such position, while the wheel 41 contacts the floor surface, the biasing member 44 is loaded such as to bias the wheel 41 against the floor surface.

The suspended wheel mechanism 42 has a limited footprint within the bed envelope. Such limited footprint may result from the geometry of the suspended wheel mechanism members and the kinematics that are achieved by such suspended wheel geometry. Compactness of the powered wheel 41 and suspended wheel mechanism 42 may prevent interference with the upper frame 11 (and other components of the bed 10) even if the retracted position is maintained, when the bed 10 is dropped to its very-low minimum height.

Referring back to FIG. 1, the powered wheel system 40 includes a control system 50, housed within a suitable control box, and a user interface 60 operatively connected to the control system 50. The control system 50 is operatively connected to and in communication with the powered wheel 41 and the actuator 43 to send and/or receive input and output signals therefrom to actuate the wheel 41 and/or actuator 43, and/or monitor the states of the powered wheel system 40. In the depicted embodiment, the box housing the control system 50 is located at the head end of the bed 10, however the control box may be located elsewhere on the bed 10.

The control system 50 may include a processing unit and a memory which has stored therein computer-executable instructions. The processing unit may comprise any suitable devices configured to implement the functionality of the control system 50 discussed herein such that instructions, when executed by programmable apparatus, may cause the functions/acts/steps performed by the control system 50 as part of the operation of the powered wheel system 40 as described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, a printed circuit board (PCB) or other suitably programmed or programmable logic circuits, custom-designed analog and/or digital circuits, or any combination thereof. The memory may comprise any suitable known or other machine-readable storage medium. The memory may comprise non-transitory computer readable storage medium, for example, but not limited to, an electronic, magnetic, optical, electromagnetic, infrared, or semiconductor system, apparatus, or device, or any suitable combination of the foregoing.

The control system 50 may include a power supply for the powered wheel system 40, such as a battery pack, a charging circuit and/or electrical circuit(s) to receive and/or convert power from an external source (e.g. the electricity network), depending on the embodiments. In the depicted embodiment, the user interface 60 is located at the opposite end, here the foot end, of the bed 10 relative to the box housing the control system 50.

The control system 50 is configured to monitor and receive one or more input signals indicative of a desired level of power assistance and/or a motion direction of the bed 10. In response to such input signals, the control system 50 is operable to power the powered wheel 41 to assist in moving the bed 10 in the desired direction with the desired level of power assistance.

Upon activation of the powered wheel 41 and actuation of the suspended wheel mechanism 42 to position the powered wheel 41 in the deployed position, a powered assistance performed by the powered wheel 41 in driving engagement with the floor surface may reduce the effort from a user to move the bed 10, with or without a patient thereon. One or more input signals indicative of the desired level of power assistance and/or a desired motion direction of the bed 10 are transmitted by the control system 50 to the powered wheel system 40 for actuation of the drive system and the powered wheel 41 accordingly. The control system 50 is thus in communication with the powered wheel 41 to drive the powered wheel with a level of power assistance proportional to a magnitude of the force applied on the end board by the user, when the powered wheel is in the deployed position. When the powered wheel is disposed in the retracted position, however, the control system 50 recognizes this retracted position of the powered wheel and thus does not transmit drive instructions thereto. In other words, any loads or forces applied by the user to the end boards of the bed will not cause the powered wheel 41 to operate, when the powered wheel 41 is in its retracted position. The user interface 60 may include button(s), indicator light(s), switch (es), screen(s) for control of the powered wheel system 40 and/or monitoring of the position, status, or other characteristics of the powered wheel system 40. The user interface 60 may include a PCB, electronic chips, etc. for receiving the input signals and/or controlling the electronics of the user interface 60 (buttons, lights, switches, screen, etc.). These input signals are received by the control system 50 and retransmitted accordingly to actuate the powered wheel system 40. Depending on the embodiments, one or more input signals may be transmitted directly to the control system 50, without bridging by the user interface 60.

Figure 3:
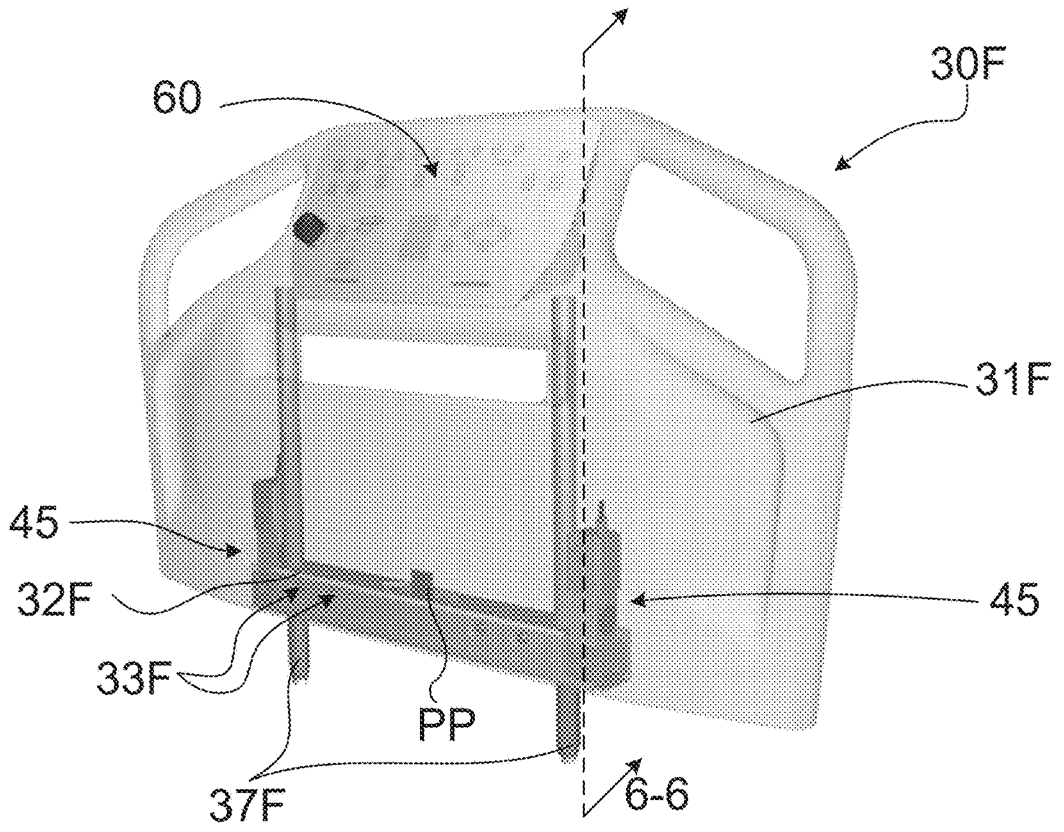
FIG. 3 is a perspective view of an exemplary end board of the medical bed of FIG. 1, according to an embodiment, the end board disconnected from the medical bed.
Figure 4:
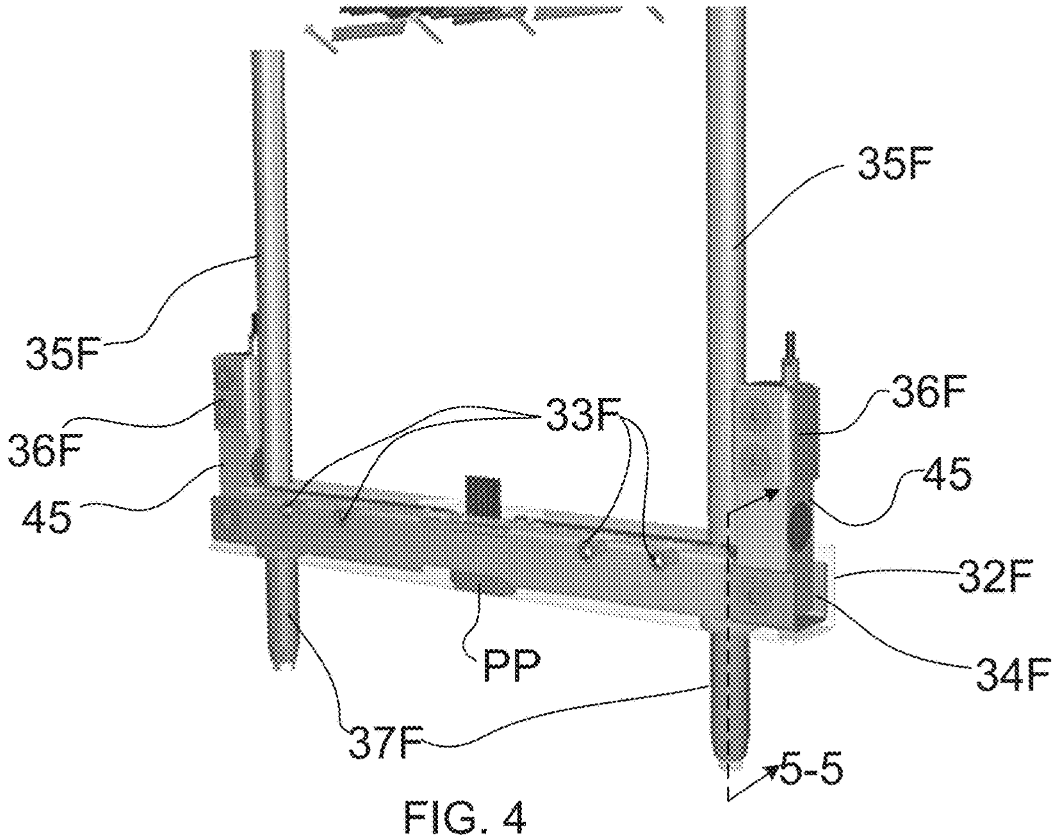
FIG. 4 is a perspective view of the exemplary end board of FIG. 3, with a panel of the end board hidden, showing components of the end board.

Referring now to FIGS. 3-4, the user interface 60 is part of the footboard 30F. Features of the powered wheel drive system 40 are embodied within the footboard 30F. At least one load cell 45 is enclosed within the footboard 30F. In the depicted embodiment, the load cell 45 forms part of a pair of load cells 45 that are employed, however in other embodiments, more than two load cells 45 may also be provided. While the footboard 30F is removable from the upper frame 11 of the bed 10, when the footboard 30F is in place, the load cells 45 are integrated with or enclosed within into the footboard 30F to limit access to contaminant such as bacteria, and/or protect the load cells 45 against direct impact. When the footboard 30F is removed from the remainder of the bed 10, the load cells 45 may remain enclosed within the footboard 30F while being electrically disconnected from the electric circuit of the bed 10 and/or control system 50.

The load cells 45 are adapted to detect a load LL applied on the footboard 30F of the bed 10. This load LL may comprise for example a force applied by the user on the footboard 30F, the forcing having a magnitude and a direction. Thus the load cells 45 are configured and operable to detect at least the magnitude of the force applied on the footboard 30F by user, such as to drive the powered wheel 41 of the powered wheel system 40 with a level of power assistance proportional to the magnitude of the force applied on the footboard by the user. In an alternate embodiment, the load cells 45 also capture and detect a direction of the force applied on the footboard by the user, such that the input signals provided by the load cells 45 to the control system are indicative of both the magnitude and the direction of the force applied. The control system 50 is, in this embodiment, therefore operable to control the powered wheel system 40 such as to position the powered wheel at a orientation or angular position corresponding to the direction of force applied by the user, to thereby enable power assisted steering of the bed (in addition to the power assisted drive).

Figure 6:
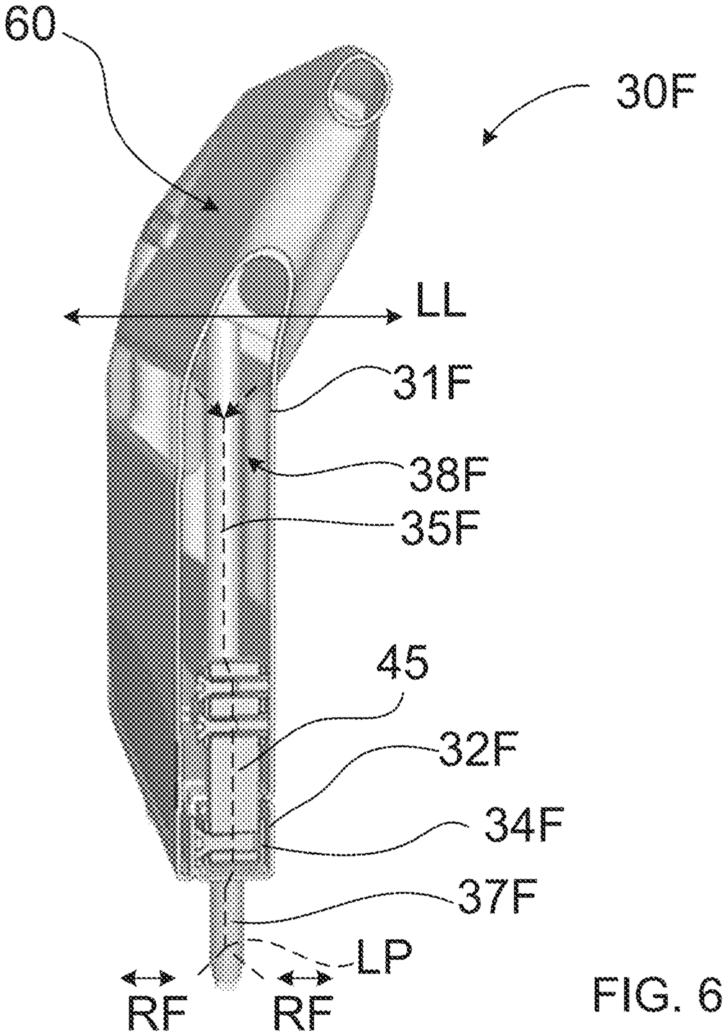
FIG. 6 is a cross-sectional view of the end board of FIG. 3 taken along plane 6-6.

In the depicted embodiment, wherein the powered wheel 41 cannot turn and thus will drive in the direction that the bed is pointed, the load LL or force may be applied in one of a first and an opposite second horizontal directions (directions parallel to the ground, and in a generally longitudinally extending direction), such as a pull or push load applied on the footboard 30F to displace the bed in a horizontal direction (see FIG. 6). The load cells 45 provide the input signals to the control system 50 indicative of the load LL applied on the footboard 30F by a user. Upon application of the load LL on the footboard 30F in at least one of the longitudinal directions (i.e. forward or rearward) at one or more locations on the footboard 30F at a time to displace the bed 10, a voltage differential produced by the load cells 45 proportional to the force amplitude of the load LL applied on the footboard 30F and representative of the direction of application of the load LL (pull or push) is transmitted to and monitored by the control system 50.

The load cells 45 may be of the shear beam type or other types. In at least some embodiments, the load cells 45 are configured to be insensitive to loads applied in one or more directions. In the depicted embodiment, the load cells 45 are insensitive to loads applied on the footboard 30F in a transverse direction (i.e. transverse to a forward-rearward direction of the bed as defined along a longitudinal axis extending between a forward end and a rearward end of the bed) and/or having no force components in any one of the forward/rearward direction of the bed 10. That is, in the depicted embodiment pushing and/or pulling the bed 10 sideways by applying a transverse load on the footboard 30F may not be detected by the load cells 45.

In at least some embodiments, the load cells 45 are configured to be insensitive to torque generated by the application of a force on the footboard 30F in a substantially vertical direction and/or in a direction normal to the longitudinal axis and a laterally extending axis transverse to the longitudinal axis (such axes defining for example a plane substantially parallel to the floor surface and/or to the mattress surface of the bed). As such, weight of equipment suspended on the footboard 30F (e.g. air compressors/ventilators, respirators, or other apparatus), which would apply a torque at the load cells 45 may not result in input signals indicative of a desired displacement of the bed 10. Such configuration of the load cells 45 may result from the internal architecture and/or position of the strain gages of the load cells 45, for instance. The control system 50 and/or the user interface 60, through signal conditioning, processing, amplification, attenuation or a combination thereof may provide such selective directional sensibility, as another possibility.

The footboard 30F is supported by the load cells 45. In other words, the footboard 30F "rests" on the load cells 45. The load cells 45 may thus be viewed as structural "pillars" of the footboard 30F. The load cells 45 define a mechanical interface between the bed frame and the remainder of the footboard 30F, whereby the loads applied to the footboard 30F and/or supported by the load cells 45 are transmitted to the bed frame (directly or via a connector arrangement, such as pins, sub-frame and/or intermediary parts suitable for interconnection of the load cells 45 to the bed frame). IN at least some embodiments, the load cells 45 define the sole mechanical coupling interface between the footboard 30F and the remainder of the bed 10 (directly of via the intermediary connector arrangement as mentioned above). The load cells 45 support at least a substantial portion of the weight of the footboard 30F. For instance, in an embodiment, the load cells 45 support at least 70% of the total weight of the footboard 30F, in some cases at least 80%, and in some particular cases at least 90% of the total weight of the footboard 30F. The load cells 45 may be viewed as a structural component of the footboard 30F. The load cells 45 are adapted to support a static load that is sufficient to support the weight of the footboard 30F and additional weight of complementary apparatus which may be hung on or otherwise supported by the footboard 30F (e.g. respirator, compressor, or other apparatus). The load cells 45 are mounted within the footboard 30F such that the load LL along one of a first and an opposite second horizontal directions may be applied at any location on the footboard 30F and still be detected by the load cells 45. A load path LP is defined between the footboard 30F and the remainder of the bed 10, with such load path LP passing entirely (almost or substantially) by the load cells 45. In other words, the footboard 30F is "isolated" or "decoupled" from the remainder of the bed 10 by the load cells 45. In other words, the load cells 45 may define part of the sole (unique) load path LP transmitting the load applied on the footboard 30F and supporting the weight of the footboard 30F when the footboard 30F is installed on the bed 10. The load applied on the footboard 30F by the user may be transmitted along the load path LP to a reaction force interface between the footboard 30F and the bed frame. An exemplary architecture of the footboard 30F and the mounting of the load cells 45 which may allow this will now be described.

As shown in FIG. 3, the footboard 30F includes a hollowed panel 31F which encloses the pair of load cell 45. As shown, the hollowed panel 31F defines an outer envelope of the footboard 30F. The hollowed panel 31F defines the user interface 60 at an upper end thereof. The hollowed panel 31F is shown in FIG. 3 with transparency such that internal structures of the footboard 30F and the pair of load cells 45 can be seen. The hollowed panel 31F is mounted at a bottom end thereof to a base frame member 32F. The base frame member 32F extends transversely with respect to the longitudinal axis of the bed 10 over a majority of the width of the footboard 30F. The hollowed panel 31F is secured to the base frame member 32F via a connecting arrangement 33F interconnecting the hollowed panel 31F and the base frame member 32F. In the depicted embodiment, the connecting arrangement 33F includes a series of fasteners, though it could be which is in the embodiment shown a plurality of male and female fasteners, though other suitable connecting arrangements could be contemplated, for instance clips, interlocking features, pins, studs, etc. In the depicted embodiment, the base frame member 32F is at least partially covered by the hollowed panel 31F. Viewed from the outside, the hollowed panel 31F and the base frame member 32F may be visually seamless, as the base frame member 32F is integrated within the hollowed panel 31F. In other embodiments, the hollowed panel 31F and the base frame member 32F may be integral such as to form a single part (e.g. co-molded, welded, etc.).

Referring to FIG. 4, the base frame member 32F is hollowed. The base frame member 32F receives an internal frame member 34F therein. The base frame member 32F and the internal frame member 34F do not contact each other. The load cells 45 are secured to the internal frame member 34F, by fastener(s) in the depicted embodiment though other means may be contemplated. The internal frame member 34F interconnects, rigidly, the load cells 45 by their respective ends. The base frame member 32F includes one or more upwardly extending members 35F. In the depicted embodiment, such members 35F are vertical tubes extending upwardly from the base frame member 32F. The members 35F define parts of an internal skeleton of the footboard 30F. The pair of upwardly extending members 35F provides transverse (longitudinally and/or laterally with respect to the bed 10) support and/or rigidity to the hollowed panel 31F. The load cells 45 are respectively secured to the pair of upwardly extending members 35F via attachment brackets 36F. The attachment brackets 36F may be secured to the members 35F in various suitable ways, such as via welding, adhesive, fasteners, or the attachment brackets 36F may be an integral part of the members 35F, depending on the embodiments. The load cells 45 are secured to the attachment brackets 36F via fasteners in at least some embodiments. The load cells 45 could be secured to the members 35F differently in other embodiments, such as to a portion of the members 35F themselves.

Figure 5:
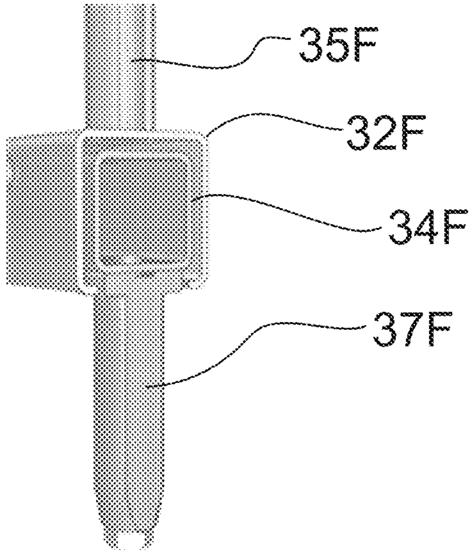
FIG. 5 is a partial cross-sectional view of the end board taken along plane 5-5 of FIG. 4.

Mounting members 37F of the footboard 30F are secured to the internal frame member 34F. The mounting members 37F are adapted to engage a mounting member receiving portion of the upper frame 11. In the depicted embodiment, the mounting member 37F are spaced apart in a lateral direction of the footboard 30F. As best seen in FIG. 3, the mounting members 37F protrude downwardly relative to a remainder of the footboard 30F. In the depicted embodiment, the mounting members 37F define rods extending downwardly from the internal frame member 34F. As shown, the rods are cylindrical and taper towards their respective ends in the embodiment shown, but such rods may have various shapes depending on the embodiments. In the depicted embodiment, as best seen in the cross-section of FIG. 5, the mounting members 37F are secured to the internal frame member 34F by fastener(s), though other means may be contemplated, such as welding, molding, etc. As shown, the mounting members 37F do not contact the base frame member 32F.

Similarly, referring to FIG. 6, the load cells 45 support the hollowed panel 31F and the base frame member 32F relative to the bed frame. In the depicted embodiment, the load cells 45 also support the upwardly extending members 35F and the brackets 36F. That is, the weight of the hollowed panel 31F, the base frame member 32F the upwardly extending members 35F and the brackets 36F is supported by the load cells 45. All such weight generates a downward force (due to gravity) that is transmitted to the load cells 45. The load cells 45 are mechanically coupled to the bed frame via the internal frame member 34F and the mounting members 37F, whereby the load cells 45 transmit the downward force to the internal frame member 34F and the mounting members 37F, then to the bed frame. As shown, the load cells 45 do not contact the hollowed panel 31F and the base frame member 32F. The hollowed panel 31F and the base frame member 32F may be defined as mechanically decoupled relative to the upper frame 11 in that they do not contact the upper frame 11, and/or in that no force applied on the hollowed panel 31F and/or the base frame member 32F can be transmitted to the upper frame 11 of the bed 10 via other load path than the load path LP defined (at least in part) by the load cells 45. In other words, the hollowed panel 31F and the base frame member 32F are mechanically dissociated from the remainder of the bed 10.

With additional reference to FIGS. 3-4, an electrical connector PP, or simply plug, socket, quick connect, for instance, is secured to the internal frame member 34F without being supported by the base frame member 32F or otherwise in contact therewith. Such electrical connector PP electrically connect the load cells 45 and the user interface 60 to the control system 50 via a bed electrical wiring (not shown). This may further promote a single load path LP via the load cells 45 and/or limit interference that may occur due to the electric wires connecting the load cells 45 and/or the user interface 60 to the control system 50. In the depicted embodiment, the electrical connector PP is the only electrical connection of the footboard 30F. In the depicted embodiment, the electrical connector PP faces downwardly in the same direction as that in which the mounting members 37F extends. As such, when the footboard 30F is pulled upwardly to be removed from the bed 10, the mounting members 37F may disengage from the upper frame 11 as the electrical connector PP disconnect from a corresponding electrical connector on the upper frame 11. As such, the footboard 30F may be removed without tools or additional steps, in at least some embodiments. The electrical connector PP may be positioned in other locations in other embodiments. Such electrical connector PP may include a magnetic clip to allow even quicker and/or easier connection/disconnection as other possibilities.

Upon application of the load LL on the footboard 30F, such as on the hollowed panel 31F, the hollowed panel 31F may contact the upwardly extending members 35F, thereby imparting a bending deformation to the upwardly extending members 35F. Such deformation may not be visible through eyes but may suffice for the load cells 45 to detect the load LL transmitted thereto via the upwardly extending members 35F. The load LL thus transmitted by the upwardly extending members 35F may follow the load path LP through the load cells 45, which detect the transmitted load LL and transmit a correlating voltage differential to the control system 50, directly or via the user interface 60. Forces equilibrium is met by reaction forces RF opposing to the load LL which are transferred to the internal frame member 34F, then the mounting members 37F and then applied to the upper frame 11 of the bed 10 via mechanical coupling therebetween, forming a force reaction interface between the bed frame and the board.

In at least some embodiments, a clearance gap 38F is defined between the upwardly extending members 35F and surfaces of the hollowed panel 31F contacting therewith upon application of the load LL. Such clearance 38F may prevent or at least limit pre-load applied by the hollowed panel 31F on the upwardly extending members 35F which may be undesirably detected by the load cells 45. The clearance 38F may facilitate the initial calibration of the load cells 45 when the powered wheel system 40 is turned on, and/or unintended power activation of the powered wheel 41 and/or suspended wheel mechanism 42 resulting from the detection of the pre-load by the load cells 45.

The powered wheel 41 is powered differently depending on the load case detected by the load cells 45. If the load transmitted to each load cell 45 is in the same direction (e.g. both detect a push or a pull from the user on the footboard 30F) the control system 50 will power the powered wheel 41 to assist in the displacement of the bed 10 in the desired direction (forward or backward). When the control system 50 detects that the load applied on the footboard 30F is released or under a selected load threshold for a selected time lapse (e.g. 1 second in a particular embodiment), the powered wheel 41 in contact with the floor surface may provide a powered deceleration assistance of the bed 10. The input signals from both ones of the load cells 45 are considered in order to provide the desired level of power assistance with the system 40.

Power activation of the powered wheel 41 will be performed proportionally with respect to the loads detected by the respective load cells 45 and input signals transmitted from the load cells 45 to the control system 50. At least in some embodiments, a summation of the loads detected by the respective load cells 45 will be performed and a corresponding input signals indicative of the sum of loads is transmitted to the control system 50 (directly or via the user interface 60). If both load cells 45 detect the loads as applied in the same direction (e.g. both a forward push, whether equal or not), the total load detected will be greater than each load detected individually by each load cell 45. In cases where the loads detected by the respective load cells 45 are detected as being applied in opposite direction (e.g. one push and one pull), the total load monitored by the control system 50 will be smaller than at least one of the loads (in absolute value) detected individually by each load cell 45. In such case, the powered wheel 41 will be driven with less power. In practice, such cases could occur when the user applies loads on the footboard 30F during a tight turn of the bed 10 being displaced. This would cause a deceleration of the powered wheel 41, hence a deceleration assistance of the bed 10 to perform a controlled turn. In some other cases, no power may be sent to the powered wheel 41 when the forces detected by each load cell 45 are equal ±a force detection threshold but in opposite directions. The summation of the forces and corresponding input signals would thus be null, or under the force detection signal threshold. Such force detection signal threshold may be selected, or limited by the load cell sensitivity.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the powered wheel system 40 may include a single load cell, such that the load path LP may be defined by only one load cell and the footboard 30F being mechanically decoupled from the remainder of the bed 10 by such single load cell, or more than two load cells to distribute the load path LP in more than two load cells. The internal skeleton of the footboard 30F may include more or less members, such as more or less upwardly extending members 37F, and/or a separate internal frame member for each load cell.

As some other examples, the powered wheel 41 and suspended wheel mechanism 42 may be located at the foot end of the bed 10. A single powered wheel 41 and suspended wheel mechanism 42 may be at the foot end of the bed 10 instead of the head end as described above with respect to various embodiments. More than one powered wheel 41 may also be employed. For example one or more powered wheels 41 may be provided at one end of the bed, and one or more additional powered wheels 41 may be provided at the opposite end of the bed. Alternately, two powered wheels may be provided at one end of the bed, with the other end being free of any powered wheels. In addition to or instead of having load cells 45 integrated in the footboard 30F, there may be one or more load cells 45 integrated in the headboard 30H. In other words, the footboard 30F is not the only end board that may be instrumented with one or more load cells 45. Application of the load LL on the footboard 30F and/or the headboard 30H could therefore be detected and input signals indicative of a desired level of power assistance from one or both of the footboard 30F and the headboard 30H may be used to power the powered wheel 41 with a level of power assistance that is proportional to the load LL applied on the footboard 30F or the headboard 30H, and/or power the suspended wheel mechanism 42 in some embodiments.

Yet as other examples, although the adjustable furniture article of the present invention is generally described with respect to a medical bed of the type used in hospitals and other medical applications, it is to be understood that the design and configuration of the present adjustable furniture article can be used for other applications, preferably although not necessary in a medical, dentistry or veterinary fields. For example, the presently described powered wheel system 40 can be applied to and used in an adjustable table or other platforms of the type, for example, used in surgical applications, and/or other vertically adjustable platforms/tables. The powered wheel system 40 may be retrofitted to an existing medical bed, such as provided as a power assistance conversion kit for a medical bed or other applicable furniture as mentioned above. Yet further modifications could be implemented by a person of ordinary skill in the art in view of the present disclosure, which modifications would be within the scope of the present technology.

The invention claimed is:

1. A medical bed comprising:

a bed frame having casters permitting rolling displacement of the bed on a floor surface, the bed frame defining a longitudinal axis extending between a forward end and a rearward end of the medical bed;

a powered wheel mounted to the bed frame via a suspended wheel mechanism, the suspended wheel mechanism including an actuator for displacing the powered wheel between a retracted position and a deployed position, the powered wheel in the retracted position defining a clearance gap between the powered wheel and the floor surface, and the powered wheel in the deployed position contacting the floor surface;

an end board mounted to the bed frame, the end board including a hollowed panel mounted to a base frame, the base frame including a transversely extending base frame member located at a lower end of the end board proximate the bed frame and an upwardly extending member projecting upwards from the transversely extending base frame member, the transversely extending base frame member and the upwardly extending member being fully enclosed within the hollowed panel; and a load cell mounted to the base frame within the hollowed panel of the end board, the load cell extending between a lower end located proximate to the transversely extending base frame member and an upper end fixed to the upwardly extending member, the load cell being a structural component of the end board, the load cell detecting a magnitude of a force applied on the hollowed panel of the end board by a user, the load cell providing one or more input signals to a control system, the one or more input signals indicative of the magnitude of the force applied on the end board by the user, the control system in communication with the powered wheel to drive the powered wheel with a level of power assistance proportional to the magnitude of the force applied on the hollowed panel of the end board by the user when the powered wheel is in the deployed position, the load cell forming at least part of a load path between the end board and the bed frame, the force applied on the end board by the user transmitted along the load path to a reaction force interface between the end board and the bed frame.

2. The medical bed as defined in claim 1, wherein the load cell supports a substantial portion of a weight of the end board.

3. The medical bed as defined in claim 2, wherein the load cell supports at least 70% of a total weight of the end board.

4. The medical bed as defined in claim 1, wherein the powered wheel is located at a head end of the medical bed.

5. The medical bed as defined in claim 1, wherein the end board is removable from a remainder of the medical bed, with the load cell remaining enclosed within the end board while being electrically disconnected from the control system.

6. The medical bed as defined in claim 1, wherein the load cell is one of two or more load cells integrated into the end board.

7. The medical bed as defined in claim 1, wherein the load path is a unique load path between the end board and the bed frame.

8. The medical bed as defined in claim 1, wherein the bed frame includes a base frame to which the suspended wheel mechanism is mounted and an upper frame to which the end board is mounted, the upper frame connected to the base frame via a plurality of articulated frame members defining a lift mechanism actuatable to displace and position the upper frame towards and away from the base frame during bed height adjustment between a fully collapsed position and a fully elevated position relative to the base frame.

9. The medical bed as defined in claim 1, wherein the load cell detects a direction of the force applied on the end board by the user.

10. The medical bed as defined in claim 9, wherein the load cell and/or the control system are configured to be insensitive to loads applied in one or more directions, while remaining sensitive to loads applied in other directions.

11. The medical bed as defined in claim 10, wherein the load cell is insensitive to loads applied on the end board in a direction transverse to the longitudinal axis.

12. The medical bed as defined in claim 9, wherein the load cell and/or the control system are configured to be insensitive to torque generated on the end board by a force applied in a substantially vertical direction and/or in a direction normal to the longitudinal axis and to a laterally extending axis transverse to the longitudinal axis.

13. The medical bed as defined in claim 1, wherein the powered wheel is bidirectional to provide motive power only in two opposite and linear directions.

14. The medical bed as defined in claim 1, wherein the control system is operable to: detect that the force applied to the end board has been released or is under a selected load threshold for a selected time lapse; and reduce the level of power assistance generated by the powered wheel to provide a powered deceleration assistance of the medical bed.

15. The medical bed as defined in claim 1, wherein the suspended wheel mechanism includes a biasing member, the biasing member operable to bias the powered wheel against the floor surface when the powered wheel is in the deployed position, and the biasing member applying little to no load against the actuator when the powered wheel is in the retracted position.

16. A medical bed comprising:

a bed frame having casters permitting rolling displacement of the bed on a floor surface, the bed frame defining a longitudinal axis extending between a forward end and a rearward end of the medical bed;

a powered wheel mounted to the bed frame via a suspended wheel mechanism, the suspended wheel mechanism including an actuator for displacing the powered wheel between a retracted position and a deployed position, the powered wheel in the retracted position defining a clearance gap between the powered wheel and the floor surface, and the powered wheel in the deployed position contacting the floor surface; and an end board mounted to the bed frame, the end board including a load cell integrated therein, the load cell detecting a magnitude of a force applied on the end board by a user, the load cell providing one or more input signals to a control system, the one or more input signals indicative of the magnitude of the force applied on the end board by the user, the control system in communication with the powered wheel to drive the powered wheel with a level of power assistance proportional to the magnitude of the force applied on the end board by the user when the powered wheel is in the deployed position, the load cell forming at least part of a load path between the end board and the bed frame, the force applied on the end board by the user transmitted along the load path to a reaction force interface between the end board and the bed frame;

wherein the end board includes a hollowed panel mounted to a base frame enclosed within the hollowed panel, the base frame including a transversely extending hollow portion and an more upwardly extending member, the transversely extending hollow portion of the base frame having an internal frame member extending therethrough without contacting the base frame, a first end of the load cell being secured to the internal frame member and second end of the load member being secured to the upwardly extending member.

17. The medical bed as defined in claim 16, wherein a clearance gap is defined between the upwardly extending member and an inner surface of the hollowed panel of the end board when no load is applied to the end board, the inner surface of the hollowed panel contacting the upwardly extending member when the force is applied to the end board.

* * * * *